E. E. WICKERSHAM.
DIRECTION INDICATOR AND MEASURING INSTRUMENT.
APPLICATION FILED DEC. 12, 1918.
1,386,666.
Patented Aug. 9, 1921.
3 SHEETS—SHEET 3.
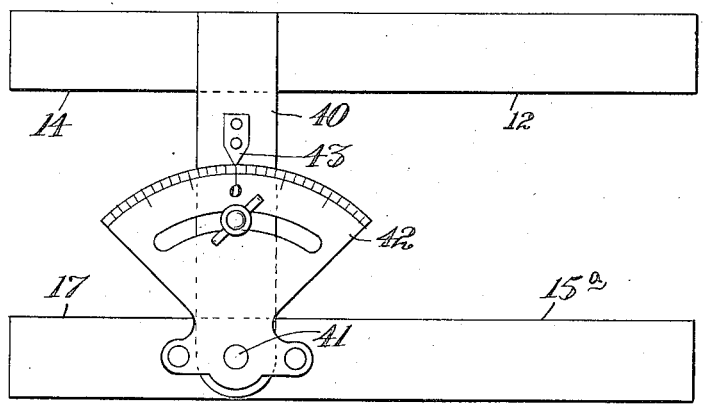
Fig. 11.
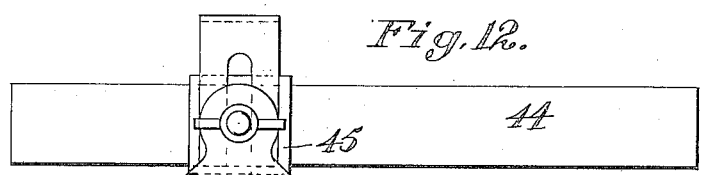
Fig. 12.
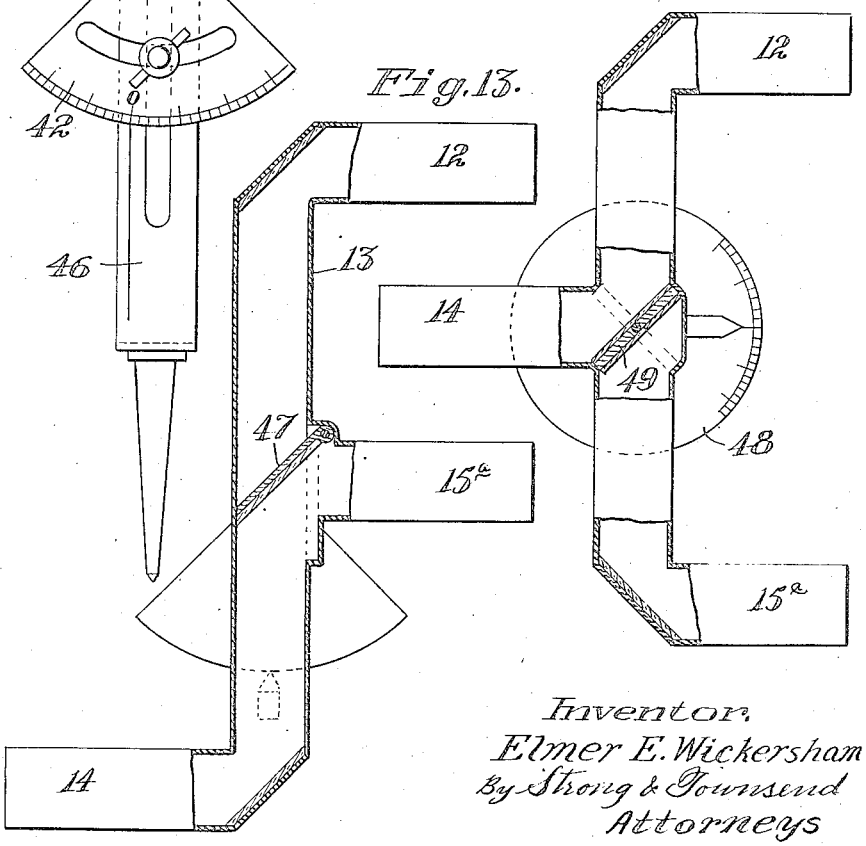
Fig. 13.
Fig. 14.
Inventor.
Elmer E. Wickersham
By Strong & Townsend
Attorneys

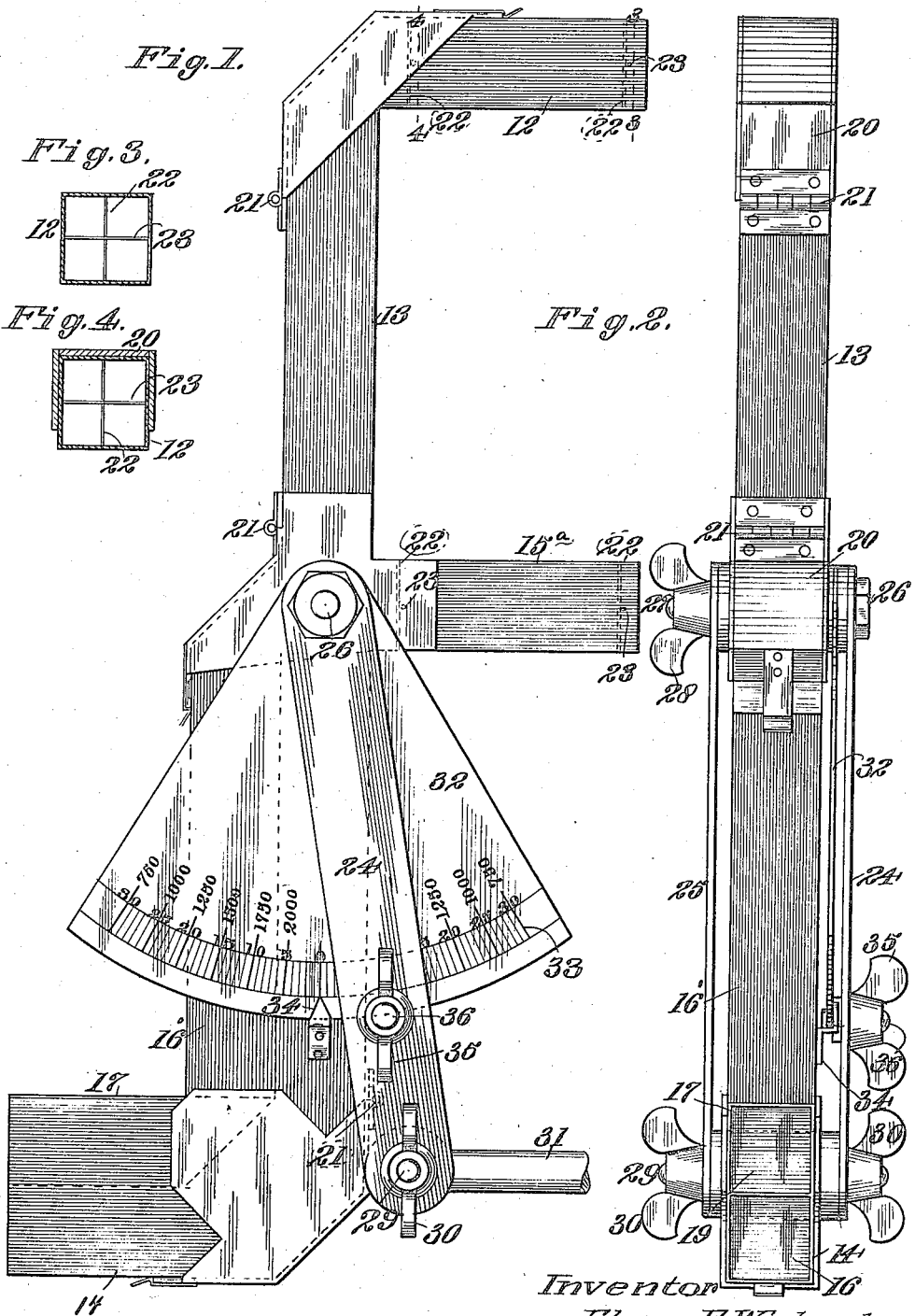

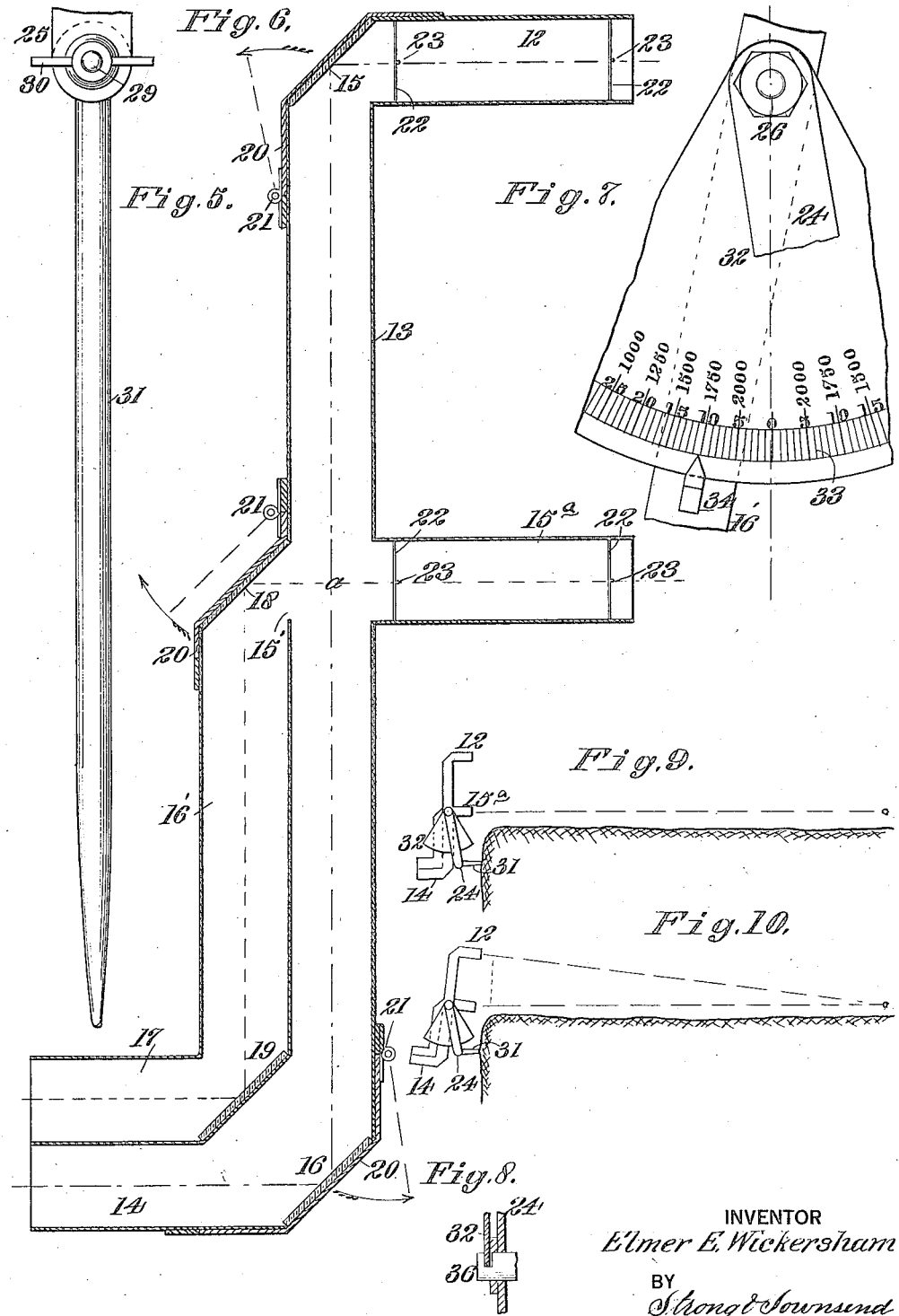

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

DIRECTION-INDICATOR AND MEASURING INSTRUMENT.

1,386,666.  Specification of Letters Patent.  Patented Aug. 9, 1921.

Application filed December 12, 1918. Serial No. 266,389.

*To all whom it may concern:*

Be it known that I, ELMER E. WICKERSHAM, a citizen of the United States, residing at Stockton, in the county of San Joaquin and State of California, have invented new and useful Improvements in Direction-Indicators and Measuring Instruments, of which the following is a specification.

This invention relates to a geometrical instrument, and particularly pertains to a surveying instrument of the light-ray type. The principal object of the present invention is to provide a surveying instrument of decidedly simple construction which may be easily operated by one not versed in higher mathematics and which may be used to accurately ascertain the distance between two points such as the range for gun fire, as well as to be used in measuring plots of ground or the height of inclinations, the operation of the present invention being noticeably distinguished from that of surveyors' transits. Due to the fact that it is not necessary to use a stadia rod nor employ the services of a rod-man in addition to the transit man, it being possible in the present instance to accurately determine the distances between points without previous preparation and solely by observations taken at a local station.

The present invention contemplates the use of a periscope arrangement, the eye pieces of which are superimposed one directly above the other, and sight tubes disposed in parallel relation to each other and spaced a considerable distance apart in vertical alinement, said sight tubes being separately connected with complementary eye pieces so that observation may be made through either of the periscope members. The periscope elements thus formed are pivotally mounted upon a supporting standard, the pivot of said standard being in transverse alinement with the central axis of the lowermost periscope observation tube. This standard maintains the apparatus in vertical alinement and permits it to swing in a vertical plane, the angular disposition being determined by a quadrant carried by the standard and adapted to coöperate with an indicating finger upon the swinging portion of the instrument.

The invention is illustrated by way of example in the accompanying drawings in which—

Figure 1 is an enlarged view in side elevation, showing the completely assembled device.

Fig. 2 is a view in end elevation further illustrating the invention as disclosed in Fig. 1.

Fig. 3 is a view in transverse section through one of the observation tubes, as seen on the line 3—3 of Fig. 1.

Fig. 4 is a view similar to Fig. 3, as seen on the line 4—4 of Fig. 1.

Fig. 5 is an enlarged view in elevation, illustrating the stake forming part of the standard.

Fig. 6 is a view in vertical section, disclosing the arrangement of both of the periscope units.

Fig. 7 is a fragmentary view in elevation, illustrating the protractor.

Fig. 8 is a fragmentary view in section, illustrating the pivotal connection of the standard and protractor dial.

Figs. 9 and 10 are diagrammatical views disclosing the manner in which the invention is utilized to find a range.

Fig. 11 is a view in plan, illustrating a modified form of surveying instrument which may be used while in a horizontal or vertical plane.

Fig. 12 is a modification of the invention, employing a single sight tube.

Fig. 13 is an alternate form of the invention, as shown in Fig. 1, illustrating the manner of making multiple observations through a single eye piece.

Fig. 14 is a view in plan of another modification of the invention, especially adapted to be used while in a horizontal position.

Referring more particularly to the drawings, 12 indicates an upper objective tube which is fixed at the upper end of a projection tube 13. This last named tube extends vertically and at right angles to the objective tube. The lower end of the projective tube unites with a sight tube 14 extending parallel to the objective tube and extending oppositely from the lower end of the projective tube. A mirror 15 is disposed at the point of juncture of the tube 12 and the vertical tube 13 and thus will reflect the light rays at right angles from the tube 12 into the tube 13. A mirror 16 is positioned at the bottom of the tube 13 and inclined to throw the light rays passing downward therethrough into the sight tube 14. It will thus be recognized that a periscope of common construction will be provided by the elements arranged in the manner described in the foregoing.

Fastened to the side of the tube 13 and extending parallel to the tube 12 is a lower objective tube 15$^a$. This tube is also in vertical alinement with the tube 12 upon the same side of the vertical tube 13. An opening 15' is formed in the back wall of the tube 13 and communicates with a secondary projective tube 16' which extends downwardly alongside the tube 13 and is fitted at its lower end with an observation tube 17 parallel to the tube 14. A mirror 18 is arranged in the back of the opening 15' to project light rays from the member 15$^a$ downwardly through the passageway 16'. A mirror 19 is arranged at the bottom of the tube 16' and completes the projection of the light through the observation tube 17. As a matter of convenience, all of the mirrors are mounted on plates 20 which are provided with hinges 21 securing them to the main body of the instrument and permitting them to be swung outwardly when desired, for cleaning purposes. Arranged within each of the objective tubes 12 and 15$^a$ are sets of stadia wires 22 and 23. The stadia wires 22 extend vertically and are spaced in relation to each other as they stand at points along the longitudinal center of each tube. The wires 23 extend horizontally and cross the wires 22 on the longitudinal center of the tubes, thus dividing the passageway through each of these tubes into four equal areas. In the present instance standards 24 and 25 are formed of metallic plates and are positioned on opposite sides of the device. The upper ends of these standards connect to the opposite sides of the case by means of bolts 26 and 27. The longitudinal axis of these bolts extends through the point $a$, as indicated on Fig. 6, this point being described as the point of intersection of the longitudinal vertical center of the tube 13 and the longitudinal horizontal center of the observation tube 15$^a$. A wing nut 28 is mounted upon the bolt 27 and acts as a clamping means for securing the instrument in any desired angular relation to the standards. The opposite ends of the standards 24 and 25 are pivotally engaged by a bolt 29 carrying a clamping nut 30. Interposed between these ends of the standards and engaged by the bolt is a stake 31, which may be driven in the ground to support the entire structure, as indicated in Figs. 9 and 10.

Fixed to the side of the instrument is a protractor quadrant 32. This quadrant is inscribed with a set of graduations 33, indicating degrees and a distance. The graduations emanate from a neutral central point which is adapted to be in register with an index finger 34 when the instrument is in its true vertically alined position. A clamping nut 35 is provided and carried by the standard 24. This nut is mounted upon a bolt 36 which engages the quadrant, as indicated in Fig. 8, thus securely gripping it and locking the main body of the instrument in relation to the standards, when desired.

The form of the invention shown in Fig. 11 embodies the use of sight tubes 12 and 15$^a$, formed integral with which are eye pieces 14 and 17. The upper member is provided with a rigid arm 40 which extends at right angles to the body of the instrument and is connected with the lower member by a pivot pin 41. Due to this construction, the sight tubes 12 and 15$^a$ may swing in the same plane and be disposed at any angle to each other. A measure 42 is fixed upon the lower member and moves therewith in relation to a pointer 43 fixed upon the arm 40. The marginal edge of the quadrant is graduated at suitable graduations, preferably indicating degrees. It will be understood, however, that the graduations may be calibrated to indicate any unit of measurement. Thus, feet, rods or miles may be caused to show upon the dial and it may be desirable to indicate the length of one side of a square acre so that the size of a plot of ground may be determined by reading from one corner thereof and along the adjacent side lines.

Reference being had to Fig. 12, it will be seen that a single sight member 44 is provided. This member is carried in a slidable hanger 45 and may be swung at an angle to its standard 46. Carried with the member is a quadrant 42 similar to those previously described. By taking an observation through the member 44 at one elevation and then moving the member a predetermined distance to another elevation, the same result will be accomplished as previously described, when the member 44 is inclined to bring the objective in focus, thus indicating the inclination or range upon the dial. The structure shown in Fig. 13 is substantially the same as that shown in Fig. 1 except that the sight tubes 12 and 15$^a$ may be alternately used in connection with a single sight tube 14. This is effected by using a swinging reflector 47 which may be inclined at right angles to the tube 15$^a$ to divert the light rays therefrom downwardly or may be swung parallel to the side wall of the vertical tube 13 to allow the light rays from the sight tube 12 to pass downwardly to the eye piece. The structure shown in Fig. 14 is preferably used in horizontal plane and is supported upon a suitable standard rigidly carrying the dial 48. By alternately swinging the reflector 49, it is possible to take observation through either of the sight tubes 12 or 15$^a$ and the single eye piece 14, thus making it possible for distance to be readily determined.

In operation of the present invention, as shown in Figs. 1 to 10 inclusive, it will be readily understood that simple observations may be made through either of the tubes 12 or 15ª observed through a corresponding sight tube 14 or 17, the instrument being placed in proper relation to this objective point by the guidance afforded by the wires 22 and 23. When it is desired to find a range, the instrument is first set up as indicated in Fig. 9 and the lower objective tube sighted directly upon the objective point. It is preferable to have the standards so positioned as to cause the pointer 34 to register with the figure 0 upon the dial when this sighting takes place. However, this is not essential and is merely a matter of convenience. After the lower objective tube has been properly sighted upon the point desired, the quadrant 32 is then swung upon its pivot bolt 26 until its central graduation registers with the pointer 34, after which it is locked in relation to the standards by the lock-nut 30. The instrument is then inclined until the upper objective tube is sighted directly upon the point desired and thereafter a reading can be made upon the quadrant. If the inclination represents 5°, this will give a basis for calculation as the distance between the parallel centers of the objective points is constant. We will then have the degree, as indicated on the quadrant and a constant base line, as indicated by the distance between the centers of the two objective tubes. The range would be then represented by the distance between the tubes divided by the sine of the angle indicated on the protractor. As the spacing of the tubes is constant, it is possible to place the exact distance in linear measurement upon the protractor as well as the degrees, thus making a direct reading possible.

Due to the provision of the stadia wires, the course of a vehicle may be determined in relation to the objective point and if it is being controlled from a remote point, may be independently maintained on a straight path of travel, as assisted by the two vertical stadia wires which are sighted directly upon the objective and thus make three points in alinement, by which the imaginary path of travel will be established. As the horizontal wires are also sighted directly upon the objective, it will be recognized that when the vehicle reaches the objective point it will be in direct alinement with the horizontal stadia wires. It will thus be seen that the device here disclosed, not alone affords simple means for observation work but means for establishing ranges and at the same time controlling dirigible vehicles which are being actuated or driven from a remote point.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

1. An optical instrument comprising complementary objective and sight tubes arranged in spaced parallel relation to each other in a vertical plane, projecting tubes connecting the complementary objective and sight tubes and means operated by the angular movement of the objective tubes when the latter are focused at a distant object to indicate the distance of said object.

2. An optical instrument comprising complementary objective and sight tubes arranged in spaced parallel relation to each other in a vertical plane, projecting tubes connecting the complementary objective and sight tubes, means whereby the distance of an object may be determined by the manipulation of said instrument and stadia wires within the objective tubes for determining when a moving body has reached the point of objective.

3. A combined periscope and range finder comprising a pair of vertical projective tubes of unequal length, objective tubes fitted at the upper ends of each of said first named tubes and standing at right angles thereto in spaced relation to each other, sight tubes connected to the lower ends of said projective tubes and superimposed, one upon the other, and mirrors disposed at the intersections of the various vertical and horizontal tubes.

4. A combined periscope and range finder comprising a pair of vertical projective tubes of unequal length, objective tubes fitted at the upper ends of each of said first named tubes and standing at right angles thereto in spaced relation to each other, sight tubes connected to the lower ends of said projective tubes and superimposed, one upon the other, and mirrors disposed at the intersections of the various vertical and horizontal tubes, and means for manipulating said instrument to determine the range of an object distant thereto.

5. A combined periscope and range finder comprising a pair of vertical projective tubes of unequal length, objective tubes fitted at the upper ends of each of said first named tubes and standing at right angles thereto in spaced relation to each other, sight tubes connected to the lower ends of said projective tubes and superimposed, one upon the other, and mirrors disposed at the intersections of the various vertical and horizontal tubes, and means for manipulating said instrument to determine the range of an object distant thereto and direct reading means for indicating the range of an object distant to the instrument.

6. An optical instrument comprising a pair of parallel projective tubes of unequal length, objective tubes, one of which is connected with the upper end of each of said first named tubes and disposed in spaced parallel relation to each other and at right angles to said first named tubes, sight tubes connected with the lower ends of said projective tubes and in superimposed relation to each other parallel to the objective tubes and extending oppositely at right angles from the opposite sides of the projective tubes, mirrors disposed within said projective tubes to receive and direct the light rays from the opening in the objective tube to the opening in the sight tube, and a pivotal mounting for supporting the instrument thus formed, whereby either of said objective tubes may be focused upon a desired point.

7. An optical instrument comprising a pair of parallel projective tubes of unequal length, objective tubes, one of which is connected with the upper end of each of said first named tubes and disposed in spaced parallel relation to each other and at right angles to said first named tubes, sight tubes connected with the lower ends of said projective tubes and in superimposed relation to each other parallel to the objective tubes and extending oppositely at right angles from the opposite sides of the projective tubes, mirrors disposed within said projective tubes to receive and direct the light rays from the opening in the objective tube to the opening in the sight tube, and a pivotal mounting for supporting the instrument thus formed, whereby either of said objective tubes may be focused upon a desired point and means whereby the manipulation of said objective tubes to bring them to alternately focus upon said point will indicate the range of said point.

8. An optical instrument comprising a pair of parallel projective tubes of unequal length, objective tubes, one of which is connected with the upper end of each of said first named tubes and disposed in spaced parallel relation to each other and at right angles to said first named tubes, sight tubes connected with the lower ends of said projective tubes and in superimposed relation to each other parallel to the objective tubes and extending oppositely at right angles from the opposite sides of the projective tubes, mirrors disposed within said projective tubes to receive and direct the light rays from the opening in the objective tube to the opening in the sight tube, a pivotal mounting for supporting the instrument thus formed, whereby either of said objective tubes may be focused upon a desired point, a protractor pivotally secured to the side of the instrument and means whereby said protractor may be locked in relation to its support to cause the angle of inclination of the instrument to be indicated.

In testimony whereof I have hereunto set my hand in the presence of two subscribing witnesses.

ELMER E. WICKERSHAM.

Witnesses:
JOHN H. HERRING,
W. W. HEALEY.